United States Patent [19]

Carl et al.

[11] 4,230,152
[45] Oct. 28, 1980

[54] MULTI-FUNCTION CONTROL VALVE

[75] Inventors: David F. Carl; Gary A. Drone, both of Springfield, Ill.

[73] Assignee: Fiat-Allis Construction Machinery, Inc., Deerfield, Ill.

[21] Appl. No.: 869,458

[22] Filed: Jan. 16, 1978

[51] Int. Cl.³ .............................................. F15B 13/07
[52] U.S. Cl. ................................. 137/596; 192/12 C; 192/13 R
[58] Field of Search ............ 137/596; 192/12 C, 13 R

[56] References Cited
U.S. PATENT DOCUMENTS

| | | | |
|---|---|---|---|
| 3,765,454 | 10/1973 | Carl | 137/625.69 X |
| 3,837,449 | 9/1974 | Drone | 192/13 R X |
| 3,895,703 | 7/1975 | Schmitt et al. | 192/13 R |

Primary Examiner—Gerald A. Michalsky
Attorney, Agent, or Firm—August E. Roehrig, Jr.; Robert A. Brown

[57] ABSTRACT

A valve for controlling the flow and pressure of fluid in a fluid operated system in which a hollow, ported control valve spool is movable in response to selective operation of a manually actuated actuator valve spool to effect modulation of a first fluid flow through the valve. One end of the hollow, ported control valve spool engages a plug portion of a freely floating piston movable in response to fluid pressure from a second fluid source to close a normally open port in the hollow control valve spool.

12 Claims, 5 Drawing Figures

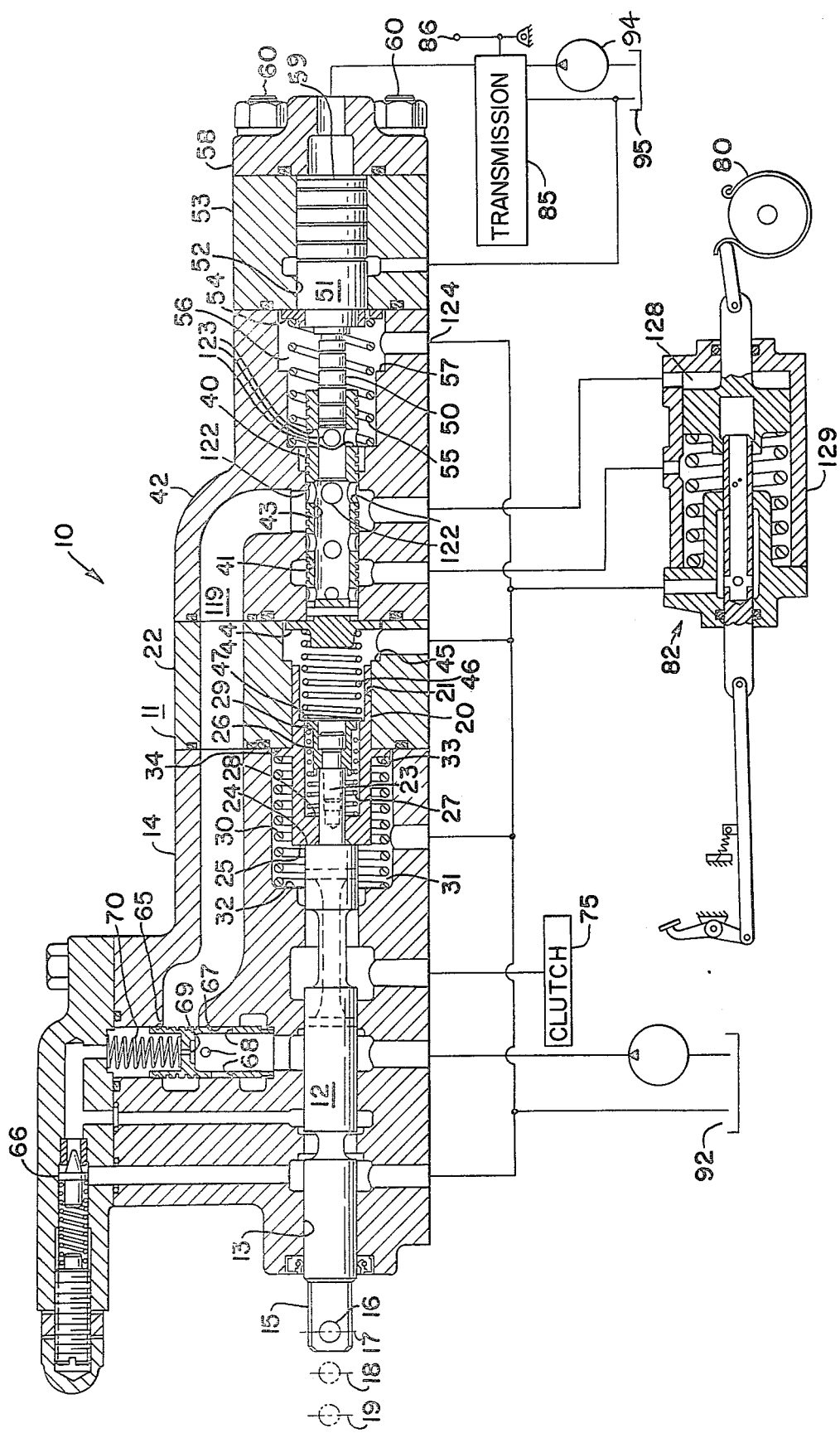

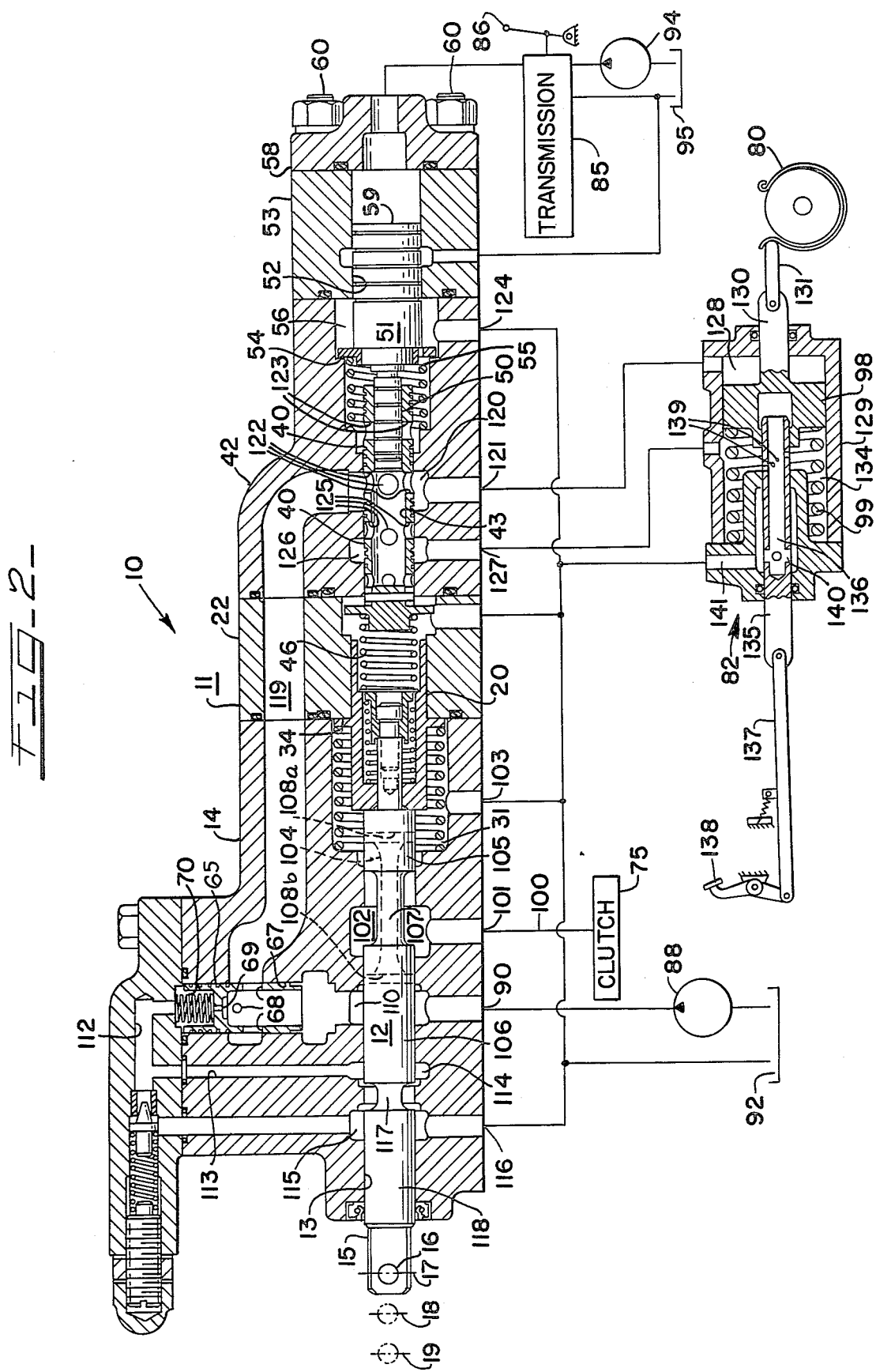

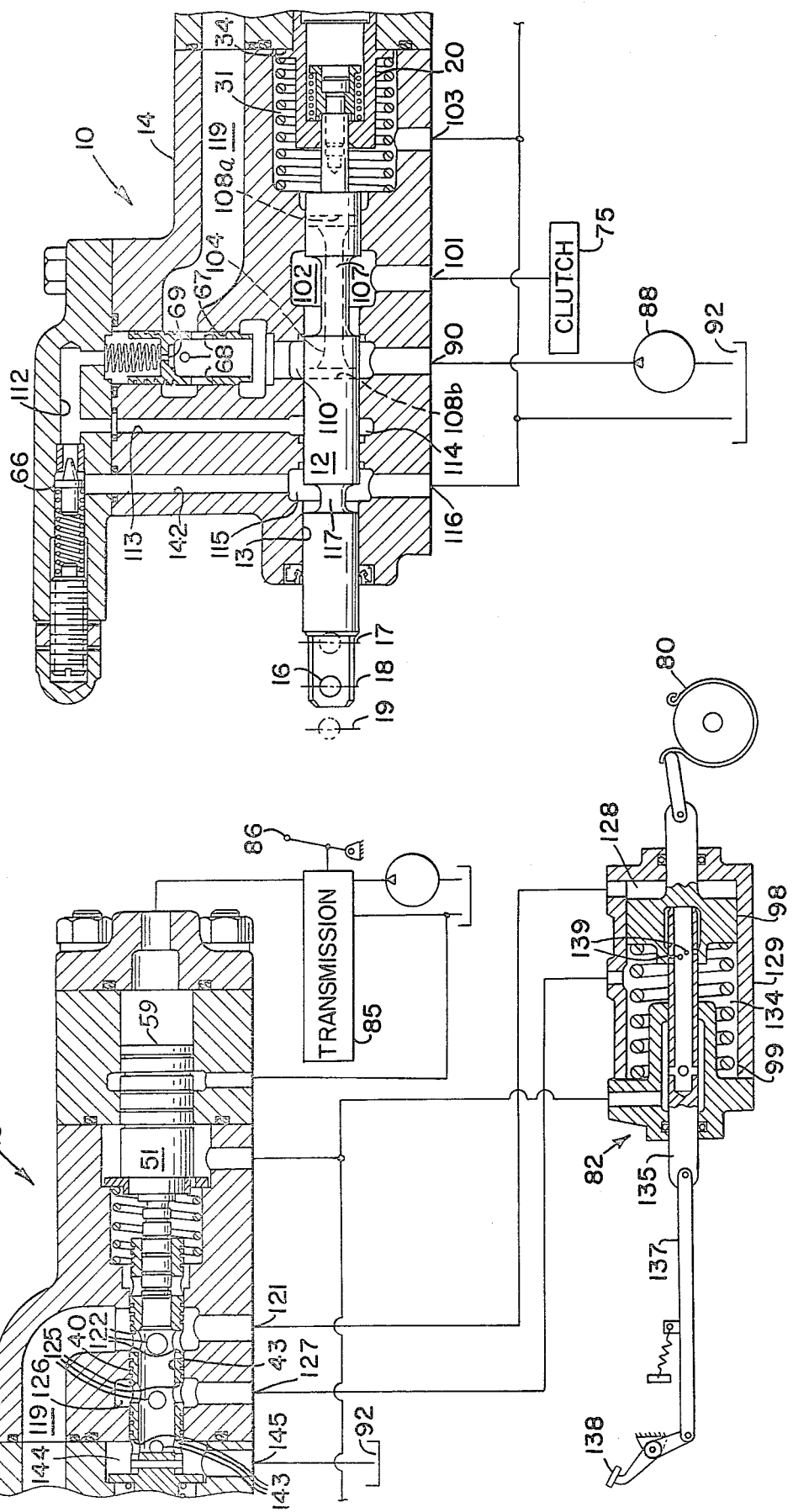

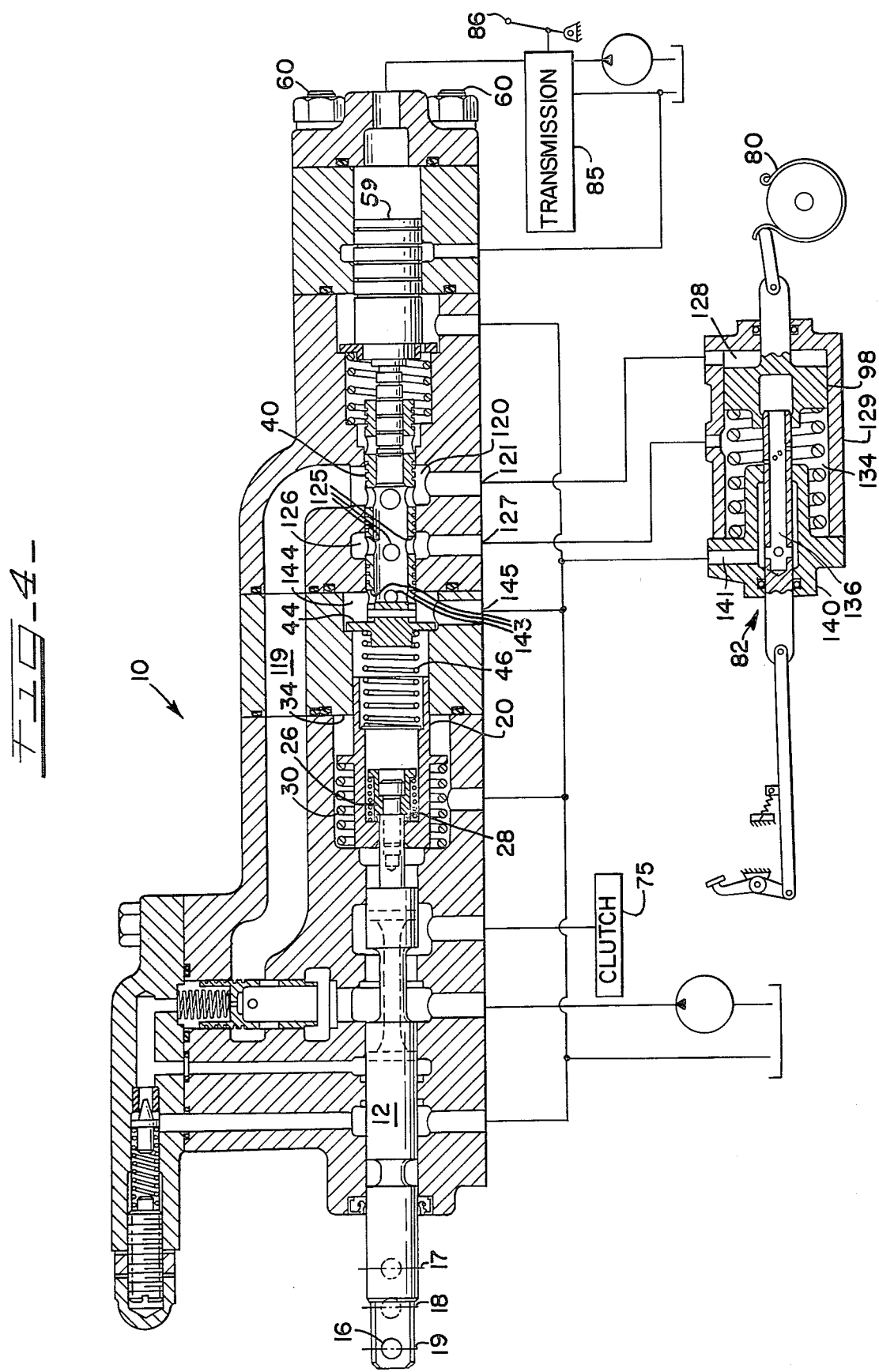

MULTI-FUNCTION CONTROL VALVE

BACKGROUND OF THE INVENTION

This invention relates in general to a control valve and, in particular, to a control valve for controlling multiple function in a fluid operated system. More specifically, but without restriction to the particular use which is shown and described, this invention relates to a control valve especially adaptable for use in a steering and brake control system for a steering-by-driving vehicle. For convenience of illustration, the invention will be described with reference to its use in the steering and brake control system of a crawler tractor, but it is believed to have general utility in any steering-by-driving vehicle.

Control of the braking and steering systems for large steering-by-driving vehicles, such as crawler tractors, has been the concern of many engineers and numerous examples of systems and apparatus to accomplish this purpose have been disclosed in various prior art patents.

In U.S. Pat. No. 3,837,449, issued on Sept. 24, 1974 in the name of Gary A. Drone, one of the present inventors, there is described and claimed a braking valve system using mechanical biased brakes and hydraulic actuators controlled by a valve system. In the system disclosed therein, a decrease of transmission drive clutch fluid pressure, such as would be caused by shifting the vehicle transmission to neutral or by the dying of the engine, would automatically result in the application of the vehicle brakes to stop the vehicle.

In U.S. Pat. No. 3,765,454, issued on Oct. 16, 1973, in the name of David F. Carl, the other of the present inventors, a valve structure is disclosed wherein an axial slot in a valve spool modulates the pressure rise by providing a graduated rise in pressure in the working fluid being applied to a controlled member, such as a clutch. Such pressure modulation is of a particular utility in controlling the steering clutches of a steering-by-driving vehicle.

While G. A. Drone, U.S. Pat. No. 3,837,449, discloses a braking valve system which is highly satisfactory for a clutching and braking system, the braking system must be actuated separately from the clutching system by manually depressing the brake pedal, or automatically in response to conditions occurring within the vehicle transmission. However, there is no provision for actuating the vehicle braking system in response to the actuation of the vehicle steering clutches, as is desirable during many operations of steering-by-driving vehicles.

One attempt to provide a system wherein the vehicle brakes are actuable in response to operation of the vehicle steering clutches as well as independently actuable is disclosed in U.S. Pat. No. 3,895,703. This patent discloses a crawler tractor vehicle having steering clutches and associated steering brakes wherein the steering brakes may be actuated independently or without disengagement of the associated steering clutch. While this patent discloses a system wherein the vehicle brakes are independently operable as well as in response to actuation of the vehicle steering clutches, the system disclosed therein does not provide for automatic braking when the vehicle transmission is placed in neutral, nor does the system provide for fail-safe operation wherein the vehicle brakes are spring actuated and pressure released such that upon failure of the hydraulic fluid system, the brakes will automatically be engaged.

SUMMARY OF THE INVENTION

It is, therefore, an object of this invention to improve control valves.

Another object of this invention is to improve multifunction control valves having a fluid flow controlling member responsive to operation of another valve element selectively actuated in response to a separate fluid.

A further object of this invention is to improve multifunction control valves by varying a valve spool resistance to movement in response to the selective movement of another valve element actuated by a separate fluid to precisely modulate the controlled functions of the valve.

Still another object of this invention is to improve control of the steering and braking systems of steering-by-driving vehicles.

Yet another object of this invention is to improve steering and braking control systems of a steering-by-driving vehicle so that the braking system is actuable independently, in response to actuation of the vehicle steering clutch, in response to selective operation of the vehicle transmission and automatically upon predetermined conditions of the vehicle hydraulic system.

These and other objects are attained in accordance with the present invention wherein there is disclosed a valve for controlling the flow and pressure of fluid in a fluid operated system in which a hollow, ported control valve spool is movable in response to selective operation of a manually actuated actuator valve spool to effect modulation of a first fluid flow through the valve. One end of the hollow, ported control valve spool engages a plug portion of a freely floating piston movable in response to fluid pressure from a second fluid source to close a normally open port in the hollow control valve spool.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a sectional view, with portions schematically diagrammed, of a multi-function control valve shown in an "at rest" condition without receiving fluid flow from sources of fluid pressure wherein the valve position selection is in a first position and a spring engageable clutch and a spring engageable brake are engaged, a steering clutch and brake representing one-half of a steering-by-driving vehicle steering system, and a transmission for vehicle propulsion;

FIG. 2 is a sectional view of the multi-function control valve and the vehicle steering and propulsion system illustrated in FIG. 1 showing the operating mechanisms of the valve and the system in an energized condition with the valve position selection remaining in the first position, with the pressure sources activated, including the transmission being in a selected gear, and with the spring engageable clutch remaining engaged while the spring engageable brake is disengaged;

FIG. 3 is a sectional view of a portion of the multifunction control valve of FIG. 2 showing the operating mechanisms of the valve in a second position which disengages the vehicle clutch;

FIG. 4 is a sectional view of the multi-function control valve of FIG. 2 showing the operation mechanism of the valve in a third position to maintain the clutch disengaged and effect engagement of the brake; and FIG. 5 is a sectional view of a portion of the multifunction control valve of FIG. 2 showing the operating mechanisms of the valve in response to actuation of an independent brake actuator control which effects engagement of the vehicle brake.

DESCRIPTION OF THE PREFERRED EMBODIMENT

Referring now to FIG. 1, there is illustrated a sectional view of a multi-function control valve generally identified by reference numeral 10 for controlling the flow and pressure of fluid in a fluid operated system. The valve 10 is comprised of a body assembly 11 having ports, fluid passageways, chambers and bored openings for receiving operating mechanisms such as valve spools, control spring and pistons. An actuator valve spool 12 is slideably received in a main bore 13 in a valve body section 14 of the body assembly 11. The main bore 13 is located in a body center section 22 which is in end facing abutment with the valve body section 14. An end 15 of the actuator valve spool 12 is connected to manually actuated control levers (not shown) for axially shifting the actuator valve spool 12 between first, second and third positions by coupling the valve spool thereto through a control connecting hole 16. The three positions of the control valve spool 12 are designated by reference numerals 17, 18 and 19, respectively. As shown in FIGS. 1 and 2, the control valve spool 12 is at the first position 17. In FIG. 3 the control valve spool 12 is shown in the second position 18 and in FIG. 4 the valve spool 12 is illustrated in the third position 19. Movement of the actuator valve spool 12 is coupled to a ported, hollow, control valve spool 40 carried within a bore 41 of a body intermediate section 42 of the body assembly 11. The ported, hollow, control valve spool 40 is movable into a position to align the ports in fluid communication with passageways formed in the body intermediate section 42.

In order to effect coupling movement of the actuator valve spool 12, and the control valve spool 40, a land shoulder 24 of the actuator valve spool 12 abuts an end portion or face 25 of a reaction member 20 carried within the body assembly 11 in a guide bore 21 and positioned in co-axial alignment with the actuator valve spool 12. The reaction member 20 is spring-biased into engagement with the land shoulder 24 by means of a sequence spring 27. The sequence spring 27 is positioned within a bore of the reaction member 20 between an internal shoulder 28 and a spring flange 29 on a retainer member 26. The axial dimension between the retainer member 26 and the internal shoulder 28 on the reaction member 20 determines the distance that the actuator valve spool 12 is movable between the first position 17 and the second position 18. The reaction member 20 is also spring biased against an internal shoulder 34 of the body assembly 11 by means of a reaction spring 30, seated within a spring cavity 31 formed in the valve body section 14, engaging an internal flange portion 33 of the reaction member 20 and an axially aligned, bottom end portion 32 formed in the valve body section 14 of the body assembly 11.

During axial movement the reaction member 20 is constrained by the reaction spring 30. The spring force of the reaction spring 30 is exerted on the external flange 33 which is normally seated against the portion 34 of the end face of the body center section 22. The reaction spring 30 is compressible to allow the end portion or face 25 of the reaction member 20 to move axially to a stop position in contact with the left end 32 of the spring cavity 31. This stop position determines the outward limit of axial movement of the actuator valve spool 12 and has been referred to herein as the third position 19.

Since movement of the reaction member 20 is in response to the forces exerted through the springs 27 and 30, with a biasing force exerted by the sequence spring 27 less than the biasing force of the reaction spring 30, the second position, 18, of the actuator valve spool 12 is defined. Such biasing force relationship between the sequence spring 27 and the reaction spring 30 requires that a greater external operating force be applied for movement of the actuator valve spool 12 from the second position 18 to the third position 18, than is required for movement from the first position 17 to the second position 18.

The operating connection for coupling movement between the actuator valve spool 12 and the reaction member 20 is effected by means of the retainer member 26 being releasably secured to the end extension 23 of the actuator valve spool 12 acting in combination with the sequence spring 27. Coupling movement between the reaction member 20 and the control valve spool 40 is provided through a normally preloaded control spring 46 interposed between an end portion 44 of the control valve spool 40 and a spring seat 47 formed as a bottom of a counterbore in the reaction member 20. It is important to note that the preload on control spring 46 will be reduced upon movement of the actuator valve spool 12 from the second position 18 to the third position 19, as will be hereinafter described in detail, which effects movement of the reaction member 20 to the left as shown in the figures.

Referring again to the control valve spool 40, a central passage or bore 43 is formed therein with an end of the central passage opposite from the end portion 44 being closed by a plug 50 slidably inserted therein with a substantially fluid sealing fit. The outer end of plug 50 is in abutting contact with an end of a piston 51 carried in a body end section 53. The plug 50 is slidable within a cylinder bore 52 coaxially aligned with the bore 41 and the main bore 13. The body end section 53 is a part of the body assembly 11 and is in end face abutment with the body intermediate section 42.

The piston 51 is freely floating within the cylinder bore 52 and is movable in response to fluid pressure applied to a face 59 of the piston from a vehicle transmission 85. A returning force acting against the applied fluid pressure is exerted against the piston 51 by a piston return spring 55 which applies an axial force against an annular ring 54 fitted on the piston 51 at the end thereof which is in abutting contact with the plug 50. The ring 54 functions to maintain the piston 51 in a normally retracted position away from the control valve spool 40, with the force of the spring 55 being taken by a shoulder in the section 42. A stop shoulder 57 in chamber 56 limits the travel of piston 51 when compressing the spring 55 and when contacted by the ring 54. The cylinder bore 52 is closed by a body end cap 58 in end face abutment with the body end section 53. The body assembly 11 is maintained as a unit by a plurality of body fasteners 60 such as capscrews, bolts or studs with appropriate nuts and washers. It will be understood that O-ring type seals are provided between the end face abutments of the recited sections 14, 22, 42, 53 and the end cap 58. Returning now to the valve body section 14, still with reference to FIG. 1, a fluid pressure regulating valve 65 and a fluid pressure relief valve 66 are provided. These valves along with the actuator valve spool 12 are substantially as disclosed, except as otherwise herein defined, in the aforementioned U.S. Pat. No. 3,765,454, issued Oct. 16, 1973, the disclosure of which is incorporated herein by reference. The regulator valve 65 is slidably positioned in a bore 67 and is shown having a series of radially positioned metering holes 68 and an axially positioned orifice 69. A spring 70 exerts a downward force on the regulator valve 65 so that in the "at rest" condition of the valve 10 and the system (represented by FIG. 1), the metering holes 68 are closed, being blocked by the bore 67.

In addition, in the "at rest" condition, with regard to a steering and brake control system, a spring-engagable, pressure-releasable steering clutch 75 is in the engaged condition. A spring-engageable vehicle brake 80 is in the engaged condition as shown by a brake actuator generally identified by the numeral 82. It will also be noted that a diagrammatically shown vehicle propulsion transmission 85 has a control lever 86 in a neutral condition and is supplied with fluid pressure from a transmission pump 94 in fluid communication with a transmission sump 95. The brake 80, the brake actuator 82, and the transmission 85, with relation to steering and control means, are substantially as disclosed in the aforementioned U.S. Pat. No. 3,837,449, issued Sept. 29, 1974, the disclosure of which is incorporated herein by reference.

The identification and function description of ports, metering holes, conduits and fluid passages as well as system components associated with an operative utilization of the multifunction control valve is hereinafter described with reference to FIGS. 2-5.

Referring now to FIG. 2, the condition of the valve 10 and other components representative of part of a crawler tractor steering and braking system is shown in which the tractor is in a straight forward or reverse travel mode. In this mode, a pair of identical valves, one of which is represented by the valve 10, each include the actuator valve spool 12 in the first position 17, with a pump 88 supplying fluid to the valve 10 via an inlet port 90 from a sump 92. As shown, the schematically illustrated, fluid pressure, control type transmission 85 is in a forward or reverse power delivery selection as indicated by the position of a control lever 86. Further, the vehicle brakes, represented by the brake 80, are shown in a released condition caused by movement of a brake actuator piston 98 to the left against the bias of a brake actuator spring 99. The spring-engagable, fluid-pressure-releasable steering clutches (represented schematically by the clutch 75) are in an engaged condition. Fluid is passed through a clutch conduit 100, a service port 101, and a service chamber 102 in fluid communication with the main bore 13 through a spring cavity 31 out a sump port 103 through conduits to the sump 92. Fluid flows througn the open main bore 13 because the actuator valve spool 12 is formed with a pair of flow modulating slots 104 located longitudinally between an inner end land 105 and a center land 106 which are connected by a reduced diameter portion 107, whereby the slots 104 join the chamber 102 and the spring cavity 31. A pair of cross drilled holes 108a and 108b are provided, one at each end of the slots 104 in the lands 105 and 106 respectively. The function of these holes will be further described with reference to FIG. 3.

Fluid entering inlet port 90 passes through an inlet chamber 110 to the fluid pressure regulating valve 65. A portion of the fluid passes through an orifice 69, a first passageway 112, a by-pass passage 113, a by-pass chamber 114, through main bore 13 to a chamber 115, out a sump port 116 through conduits to the sump 92. Passage is possible through the main bore 13 because the valve spool 12 is formed with a reduced diameter 117 between the center land 106 and an outer end land 118 to provide gaps between the actuator valve spool 12 and the bore 13 for passage of fluid at low pressure. With regard to the regulator valve 65, pressure drop exists across the orifice 69 which raises the regulator valve 65 against the bias of the spring 70 and permits fluid to flow through the metering holes 69 into a second passageway 119, to a chamber 120, and to a first or brake release outlet port 121. Fluid pressure is regulated to approximately 200 psi, by the control valve spool 40, when flow is blocked after leaving port 121 and after entering the central passage 43 through a plurality of radially drilled holes 122.

The transmission pump 94 is effective for moving the piston 51 to the left thereby extending the plug 50 into the central passage 43 and closing a plurality of radial holes 123 preventing flow of fluid through a sump port 124 and conduits to the sump 92. Therefore, the fluid in the centrally bored hole 43 reacts against the plug 50 to force the control valve spool 40 to the left against the bias of the control spring 46 until a series of metering holes 125, which are radially positioned in the control valve spool 40, are in fluid communication with a chamber 126 and a second or brake apply outlet port 127 for controlling the pressure to a predetermined level (approximately 200 psi) in the chamber 120 and connecting passages.

In utilizing the valve 10 in a tractor steering clutch and brake control system, the pressure at the first or brake release outlet port 121 is used to release the brake 80 by acting on the piston 98 carried within a piston chamber 128 in a brake cylinder assembly 129 of the brake actuator 82. The piston 98 has a piston rod 130 extending to the right (FIG. 2) through an end of the cylinder assembly 129 and operatively connected to the brake 80 by a link 131. Therefore, fluid pressure in the chamber 128 moves the piston 98 to the left releasing the brake 80. Fluid from the second or brake apply outlet port 127 is also delivered to the brake cylinder assembly 129 into a spring chamber 134 at the side of the piston 98 opposite from the chamber 128. A brake valve member 135, having an internal passage 136, is slidably fitted in a recess of the piston 98 at an inner end and extends to the left through an end of the cylinder assembly 129 and has a control link 137 connected to a brake control pedal 138. The brake valve member 135 has a series of radially positioned flow modulating metering holes 139 coupling the internal passage with the spring chamber 134.

Radially drilled holes 140 provide fluid communication from the internal passage 136 to a chamber in the cylinder assembly 129 which is connected by a fluid passage 141 to conduits leading to the sump 92. It can therefore be seen that fluid from the second or brake apply outlet port 127 of the valve 10 can pass at low pressure into the spring chamber 134, through the metering holes 139, the internal passage 136, holes 140, passage 141 to the sump 92.

Having thus described the first position of the valve spool 12 under the condition illustrated by FIG. 2, it is to be noted that only the first or brake release outlet port 121 is pressurized and that the service port 101 and the second or brake apply outlet port 127 are not pressurized.

Now considering FIG. 3 it will be noted that in moving the actuator valve spool 12 from the first position 17 to the second position 18, the reaction member 20 is still in the same position shown with reference to FIGS. 1 and 2. Therefore, the actuator valve spool 12 movement has no influence on the condition of the fluid flow and pressure at the first or brake release outlet port 121 or the second brake apply outlet port 127 that was described with reference to FIG. 2.

Initial movement of the actuator valve spool 12, from position 17 to position 18, opens a fluid passage from the inlet chamber 110 into hole 108b through the pair of slots 140 into the chamber 102. Fluid flow from the chamber 114 into the chamber 115 will be prevented by the closing of the passage from the chamber 114 effected by the movement of the actuator valve spool 12. Continued movement of the actuator valve spool 12 will progressively relieve restriction on the fluid entering the flow modulating slots 104 and will progressively impose greater restriction on the fluid passing through the slots 104 into the spring cavity 31 and sump port 103. This action accomplishes a modulated increase in pressure in the chamber 102 and the service port 101 for modulatingly releasing the clutch 75 which will be fully released when the hole 108a is finally blocked at the second position 18 of the actuator valve spool 12.

At this point of full clutch release the pump 88 pressure is determined at approximately 500 psi by the opening of relief valve 66 to allow flow through a low pressure passage 142, the chamber 115, and the port 116 to the sump 92. Only a portion of the flow from pump 88 passes through the relief valve 66 because a pressure drop across the orifice 69 causes the regulator valve 65 to remain in an upward position permitting much of the fluid to pass through the metering holes 68 into the passage 119. The pressure in passage 119 is approximately 200 psi, in view of the condition downstream defined with reference to FIG. 2. With reference to the conditions of FIG. 3 (in which the pump is approximately 500 psi), the predetermined setting of the relief valve 66 is approximately 500 psi less the pressure drop across the orifice 69, or approximately 475 psi.

With reference to FIG. 4, it is noted that the actuator valve spool 12 of the valve 10 is at the third position 19. The vehicle transmission 85 is still in either a forward or reverse travel condition which is determined by the position of the control lever 86, and the clutch 75 is still disengaged. However, it is also noted that the brake 80 is in the spring-engaged condition for reasons as hereinafter described.

When the actuator valve spool 12 is moved from the second position (18) toward the third position (19) the retainer member 26, being in contact with the internal shoulder 28 of the reaction member 20, moves the reaction member 20 to the left against the bias of the reaction spring 30, as previously described. This movement of the reaction member 20 is effective to reduce the preload on the control spring 46 in a progressive or modulating manner in proportion to the movement of the actuator valve spool 12 and the reaction member 20. This tends to reduce the pressure in the chamber 120 and connecting passages by allowing the fluid to more readily pass through the metering holes 125 to the chamber 126 and the second or brake apply outlet port 127. Also, a reduced pressure occurs at the first or brake release outlet port 121 which allows the pressure in the piston chamber 128 of the brake cylinder assembly 129 to decrease and permitting the piston 98 to move to the right thereby engaging the brake 80. A gradual movement of the actuator valve spool 12 from the second position 18 to the third position 19 gradually reduces the preload on the control spring 46 causing a modulated reduction of pressure by allowing the control valve spool 40, to gradually move to the left. This pressure reduction modulation results in modulated engagement of the vehicle brake 80. A final relieving of pressure, in addition to that provided through the brake apply outlet port 127, is provided through a plurality of holes 143 radially drilled adjacent to the end portion 44 of the control valve spool 40. The holes 14 are communicable with a chamber 144 which connects with a sump port 145 in fluid communication with the sump 92. The holes 143, chamber 144, and sump port 145 serve an additional function as will be hereinafter described with reference to FIG. 5.

FIG. 5 represents a condition wherein brake engagement control is independent of the control provided by operation of the actuator valve spool 12. When the brake pedal 138 is depressed, the link 137 moves the brake valve member 135 to the right inwardly into the piston 98 whereby the metering holes 139 are progressively blocked by the piston 98. Since the free-flow of fluid from the brake apply outlet port 127 to the sump that was described with reference to FIG. 2 is progressively blocked, pressure will gradually increase in the spring chamber 134 in proportion to movement of the pedal 138. At full travel of the pedal 138 the fluid pressure in the spring chamber 134 and the piston chamber 128 will be equal because the holes 122 and 125 in the control valve spool 40 are in communication with each other and with the outlet ports 121 and 127. The spring 99 will then move the piston 98 to the right thereby fully engaging the vehicle brake 80. Since flow out of the spring chamber 134 to the sump is blocked, the control valve spool 40 acts as a relief valve permitting fluid from passage 119 to pass through the holes 122, the central passage 43, the holes 143 to the chamber 144 out the port to the sump 92.

Another brake engagement mode is provided as will be understood by again referring to FIGS. 1 and 2. In the condition of FIG. 2 the vehicle brake 80 is disengaged and the vehicle transmission 85 is in a forward or reverse travel selection. Now assume that the vehicle transmission is shifted to neutral as shown by the position of the lever 86 in FIG. 1. Fluid pressure acting to extend the piston 51 to the left (as shown in FIG. 2) will be relieved by returning fluid to the transmission sump 95. The piston 51 will then retract to the right under the influence of the piston return spring 55. This will permit fluid pressure in the central passage 43 to force the plug 50 to the right. The new position of the piston 51 and the plug 50 as well as the position of the control valve spool 40 is now as shown in FIG. 1. It is seen that the radial holes 123 in the control valve spool 40 are no longer closed by the plug 50. This now allows the pressure fluid in chamber 119 and in the piston chamber 128 of the brake cylinder assembly to escape into chamber 56 and through port 124 to the sump 92.

Having thus described a preferred embodiment, the present invention provides a novel multi-functional control valve having utility in a steering-by-driving vehicle steering and braking system. Several advantages and characteristics including those apparent from the foregoing description and others are inherent in the invention. It is anticipated that changes and modifications to the described form of the valve and system will occur to those skilled in the art and that such changes and modifications may be made without departing from the spirit of the invention or the scope of the appended claims.

What is claimed is:

1. A multi-function control valve for controlling fluid flow and pressure in a fluid operated system comprising
   a valve body having a bore, an inlet port, an outlet port, at least one sump port and a service port normally in fluid communication with said sump port,
   fluid pressure and flow regulating means carried by said valve body for regulating fluid pressure and flow therethrough,
   fluid pressure relief means carried by said valve body for limiting the pressure of fluid therein,
   said valve body communicating said inlet port with said fluid pressure and flow regulating means, and communicating said fluid pressure relief means with said sump port,
   a selectively positionable valve spool supported in the bore of said valve body for movement among positions to communicate said inlet port with said service port and to close communication between said service port and said sump port, and to close communication through said fluid pressure and flow regulating means and said sump port, and to communicate said inlet port with said fluid pressure relief means,
   a fluid passageway formed in said valve body intersecting with said bore formed therein and connecting said fluid pressure and flow regulating means in fluid communication with said outlet port for passing fluid therethrough in a direction to apply a fluid pressure to control valve means,
   control valve means supported in said bore for reciprocal movement in response to fluid pressure in said fluid passageway,
   biasing means for applying a variable biasing force to said control valve means in a direction opposed to the direction of the force applied thereto by the fluid pressure in said fluid passageway, and
   reaction means operatively connected between said valve spool and said biasing means for varying the biasing force of said biasing means in response to the positioning of said selectively positionable valve spool to control fluid pressure in said passageway.

2. The apparatus of claim 1 wherein said selectively positionable valve spool, said control valve means, said biasing means and said reaction means are coaxial.

3. The apparatus of claim 1 wherein said control valve means is movable toward said valve spool in response to an increase of fluid pressure in said fluid passageway.

4. The apparatus of claim 1 wherein said biasing means comprises a control spring applying a mechanical force to said control valve means.

5. The apparatus of claim 1 wherein said valve spool includes spaced land portions interconnected by means for modulating fluid flow therebetween.

6. The apparatus of claim 1 wherein said reaction means comprises
   a reaction member axially aligned and operatively coupled with said valve spool and initially biased against a shoulder in said valve body by a first spring means,
   coupling means operatively coupling said reaction member to said valve spool including a retainer member secured to an end of said valve spool and a second spring means interposed between said retainer member and said reaction member,
   said coupling means permitting movement of said valve spool from a first position to a second position under compression of said second spring means to effect fluid communication between said inlet port and said service port and close communication between said service port and said sump port, and
   said reaction member is in operative contact with said biasing means and is axially movable with said valve spool when said valve spool is moved from said second position to a third position upon compression of said first spring means sequentially following compression of said second spring means to reduce the biasing force of said biasing means thereby reducing fluid pressure in said passageway and said outlet port.

7. The apparatus of claim 1 further including a selectively operable dump means operably connected to said control valve means and actuable to effect release of fluid pressure from said passageway and said outlet port to said sump port.

8. The apparatus of claim 1 wherein said control valve means includes,
   a cylindrical flow control member having a central passage open at one end and having apertures radially formed therein,
   selectively operable dump means in the open end of said central passage operable upon slidable movement from an aperture closed position to an aperture open position for permitting release of fluid pressure from said regulating means and said outlet port to said sump port in said aperture open position.

9. The apparatus of claim 8 wherein said selectively operable dump means comprises a pilot fluid operated piston actuable in response to fluid pressure to effect fluid flow through said control valve means and reduce fluid pressure in said fluid passageway.

10. The apparatus of claim 8 wherein said cylindrical flow control member includes a cylinder having a wall portion, a central passage, a closed end, an open end and having a plurality of axially spaced apertures through said wall portion,
   a first aperture being formed in said wall portion adjacent said open end for effecting fluid communication between said central passage and said sump port,
   a second aperture being formed in said wall portion for communicating fluid among said central passage and said outlet port and said fluid regulating means,
   a third aperture being formed in said wall portion for effecting fluid communication between said central passage and another outlet port,
   a fourth aperture being formed in said wall portion adjacent said closed end for effecting fluid communication between said central passage and said sump port, said selectively operable dump means being positioned for selectively closing said first aperture to prevent passage of fluid therethrough, and said control valve means being responsive to fluid pressure within said central passage reacting against said slidable movement of said selectively operable dump means for moving said cylindrical flow control member against the biasing force applied thereto.

11. The apparatus of claim 10 wherein said selectively operable dump means is a plug normally maintained in a position in which said first aperture is open and is movable to a position for closing said first aperture by a pilot fluid operated piston.

12. The apparatus of claim 8 wherein said selectively operable dump means is normally in said aperture open position and is movable to said aperture closed position by a pilot fluid operated piston.

* * * * *